US005136628A

United States Patent [19]

Araki et al.

[11] Patent Number: 5,136,628

[45] Date of Patent: Aug. 4, 1992

[54] VIDEO TELEPHONE

[75] Inventors: Shoji Araki; Yukinobu Takano; Tadahisa Yamamoto, all of Kanagawa; Noriyuki Uchiumi, Tokyo, all of Japan

[73] Assignees: Nippon Telegraph and Telephone Corporation; Sony Corporation, Tokyo, Japan

[21] Appl. No.: 210,940

[22] Filed: Jun. 24, 1988

[30] Foreign Application Priority Data

Jun. 26, 1987 [JP] Japan ............ 62-158884

[51] Int. Cl.[5] ............ H04N 7/14; H04M 11/00

[52] U.S. Cl. ............ 379/53; 358/85

[58] Field of Search ............ 379/53, 54, 96, 110; 358/85, 133, 11, 12

[56] References Cited

U.S. PATENT DOCUMENTS 3,507,981 4/1970 Eilenberger ............ 358/12
4,485,400 11/1984 Lemelson et al. ............ 379/53
4,740,831 4/1988 Rhodes ............ 358/11
4,802,003 1/1989 Takei et al. ............ 358/12

FOREIGN PATENT DOCUMENTS 0010813 5/1980 European Pat. Off. .
0050611 4/1977 Japan ............ 358/85
0158182 9/1984 Japan ............ 379/53
0142986 6/1988 Japan .
1547598 6/1979 United Kingdom .
2173675 10/1986 United Kingdom ............ 379/53

OTHER PUBLICATIONS

"Digital Circuits in the video telephone", INSPEC, Phillips Tech. Review, vol. 36, No. 8, pp. 233–241, 1976.

*Primary Examiner*—Thomas W. Brown
*Assistant Examiner*—Wing F. Chan
*Attorney, Agent, or Firm*—Hill, Van Santen, Steadman & Simpson

[57] ABSTRACT

A video telephone for transmitting video data of a still picture through an audio signal line includes an image pickup tube for picking up a picture of the still picture, an A/D (analog-to-digital) converter for converting the analog output picked up by the image pick-up tube to the form of a digital signal, a memory for storing the output of the A/D converter as video data, a modulating circuit for modulating the video data stored in the memory into a modulated signal of an occupied frequency band corresponding to a transmission band of the signal line, a circuit for transmitting the modulated output of the modulating circuit to the signal line, a circuit for generating a synchronizing pulse and a frequency-dividing circuit for frequency-dividing the color subcarrier signal to provide signals necessary for the A/D converter, the memory, and the modulating circuit, wherein the video data is a signal which results from thinning the picked-up output at a predetermined ratio.

1 Claim, 6 Drawing Sheets

FIG. 2
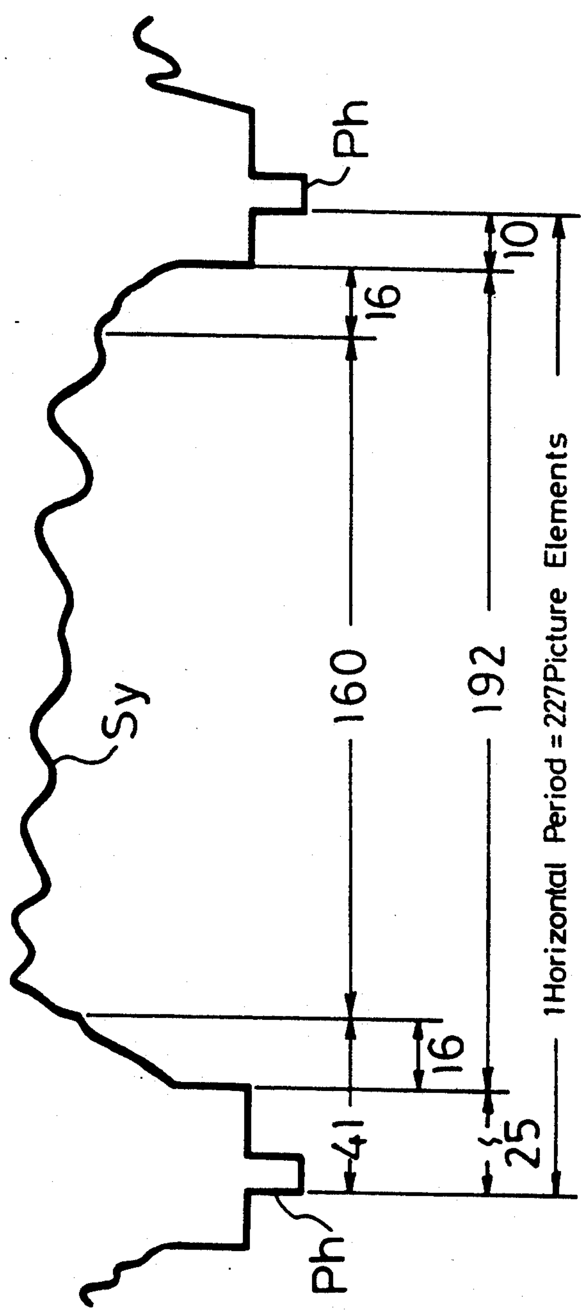
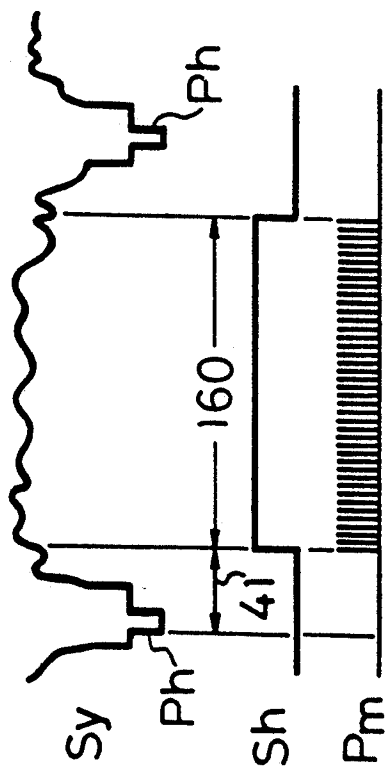
FIG. 8A
FIG. 8B
FIG. 8C

PRINTER
DEFLECTION CKT.
D/A CONV.
SYNC
MEMORY CONTROLLER
MEMORY
MEMORY
DIGITAL AM-MOD. CKT.
ADJUSTING ATTENUATOR
BPF
CLT N DET CKT.
NO
NC
LEDS
SYSTEM CONTROLLER
A/D CONV.
PROCESSOR CKT.
IMAGE PICK-UP TUBE
DEFLECTION CKT.
FORMING CKT.
FREQUENCY DIVIDING CKT.
DEMODULATING CKT.
A.G.C. VOLTAGE DET. CKT.
S/H CKT.
G.C.A.
WAVE FORM SHAPING CKT.
VDMK DET. CKT.
BPF

VIDEO TELEPHONE

BACKGROUND OF THE INVENTION

1. Field of the Invention

This invention relates generally to a still picture transmitting apparatus and is more particularly directed to a video telephone which can transmit video data as well as audio data through general telephone lines.

2. Description of the Prior Art

When realizing a video telephone, if a video signal is transmitted as it is, expensive special telephone lines of a wide band are required. Therefore, except for an enterprise or the like using such a video telephone in an important conference, individuals cannot afford such a video telephone readily.

For this reason, a personal video telephone must use public telephone lines. A public telephone line, however, is used to transmit an audio signal and hence its transmission band ranges from 300 to 3400 Hz so that in this case, an image to be transmitted must be a still picture, and the video signal thereof is timebase-expanded for transmission.

FIG. 1 illustrates a transmission system of such a conventional video or television telephone. A video camera 1 produces a luminance signal Sy, and this signal Sy is supplied to an A/D (analog-to-digital) converter 2, in which it is converted into a digital signal. Then, the digital signal of one field period is written into a memory 3 and is also read out therefrom at a predetermined low speed. The thus read-out signal is supplied to a register 4. Then, the digital signal of one field period is written in a memory 3 and is also read out therefrom at a predetermined low speed. The converts the signal from a parallel signal to a serial signal. The serial signal therefrom is supplied to a MODEM 5, in which it is converted into an FSK signal of a frequency band lying within the transmission band of public telephone lines. This FSK signal is transmitted to a public telephone line 9.

Further, the luminance signal Sy is supplied to a synchronizing separating circuit 6 which extracts therefrom a vertical synchronizing pulse Pv and a horizontal synchronizing pulse Ph. These pulses Pv and Ph are supplied to respective circuits as timing signals. Also, the pulse Ph is supplied to a PLL (phase-locked loop) circuit 7 which derives an alternating signal having frequency 4fc four times as high as a color subcarrier frequency fc. The alternating signal therefrom is supplied to a frequency-dividing circuit 8, in which it is frequency-divided into pulses of predetermined frequencies. These frequency-divided pulses are supplied to the circuits 2 to 5 as clocks thereof.

Thus, according to such a video telephone, an image can be transmitted, by utilizing the public telephone lines, in the form of a black-and-white still picture.

Meanwhile, the number of picture elements in one frame, however, is expressed as $$525 \text{ horizontal lines} \times (55525 \times 4 \times 3) \text{ picture elements} = 367500 \text{ picture elements}$$

Thus, if the bit number per picture element is assumed as 8 bits where a transmission rate is 2400 bps, the transmission time is expressed as follows.

$$367500 \text{ picture elements} \times 8 \text{ bits}/2400 \text{ bps} = 1225 \text{ seconds}$$

As a result, it take more than 20 minutes to transmit one still picture, and this cannot be done in practice.

Furthermore, the memory 3 needs a capacity of 8 bits×367.5 k addresses and this is also not practical.

OBJECTS AND SUMMARY OF THE INVENTION

Accordingly, it is an object of the present invention to provide an improved video telephone which can obviate the defects encountered with the prior art.

It is another object of the present invention to provide a video telephone which can utilize general telephone lines to transmit excellent pictures.

It is a further object of the present invention to provide a video telephone which can reduce the transmission time of video data by thinning the picture elements at a proper ratio.

It is yet a further object of the present invention to provide a video telephone of which the video data can be stored in a recording medium such as a magnetic tape by a video tape recorder.

According to an aspect of the present invention, there is provided a video telephone for transmitting video data of a still picture through an audio signal line comprising:

a) an image pick-up tube for picking up a picture of said still picture in accordance with the standard television system;

b) an A/D (analog-to-digital) converter for converting the analog output picked up by said image pick-up tube to the form of a digital signal;

c) a memory for storing the output of said A/D converter as video data;

d) a modulating circuit for modulating said video data stored in said memory into a modulated signal having a frequency band corresponding to a transmission band of said signal line;

e) a circuit for transmitting the modulated output of said modulating circuit to said signal line;

f) a circuit for generating a color subcarrier signal of said standard television system and a synchronizing pulse of said standard television system necessary for said image pick-up tube; and g) frequency-dividing circuit for producing from said color subcarrier signal signals necessary for said A/D converter, said memory and said modulating circuit, wherein said video data is a signal which results from thinning said picked-up output at a predetermined ratio and a signal representing an effective picture screen, of which the upper, lower, right and left portions are removed, in a frame shape is extended to the whole of said effective picture screen by an over-scan operation.

According to another aspect of the present invention, there is provided a video telephone for transmitting video data of a still picture through an audio signal line comprising:

a) an image pick-up tube for picking up a picture of said still picture;

b) an A/D converter for converting the analog output picked up by said image pick-up tube in the form of a digital signal;

c) a memory for storing the output of said A/D converter as video data;

d) a modulating circuit for modulating said video data stored in said memory into a modulated signal having a frequency band corresponding to a transmission band of said signal line; and e) a circuit for transmitting the modulated output of said modulating circuit to said signal line, wherein the number of picture elements forming one picture screen in said video data is selected to be 160 in the horizontal direction and 100 in the vertical direction.

The above, and other objects, features and advantages of the present invention will become apparent from the following detailed description of the preferred embodiment to be taken in conjunction with the accompanying drawings, throughout which like reference numerals identify the same or similar parts.

BRIEF DESCRIPTION OF THE DRAWINGS

FIG. 2 is a schematic representation used to explain the sampling operation;

FIGS. 8A to 8C are respectively timing charts used to the operation of FIG. 7.

DETAILED DESCRIPTION OF THE PREFERRED EMBODIMENT

Figure 1:
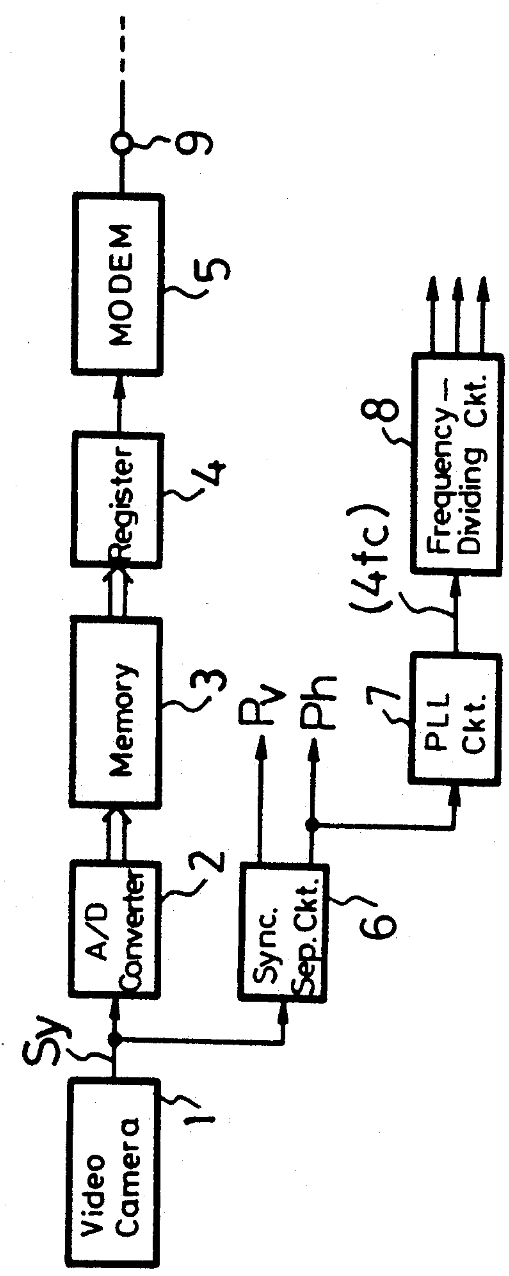
FIG. 1 is a block diagram showing an example of a transmitting system of a conventional video telephone.

Let us first explain the standard of picture of a video telephone to which this invention can be applied.

If now the NTSC system is taken as the standard television system, as described above, one frame thereof includes 367500 picture elements. So, to transmit the above-mentioned information amount, as it is, through the public telephone lines takes a lot of time and this is not convenient in practice. Therefore, according to this invention, the picture elements are thinned at a proper ratio and then transmitted.

Let us consider the number of picture elements in one horizontal line. When a video signal is digitized in accordance with the international standards of a digital VTR (video tape recorder), a color subcarrier frequency fc ($\cong$3.579545 MHz) is taken as a reference frequency and a luminance signal is sampled by the frequency 4fc, four times as high as the color subcarrier frequency fc, thus providing 768 effective picture elements per horizontal line. Thus, 256 picture elements, 192 picture elements, 128 picture elements and 64 picture elements are each obtained by dividing 768 picture elements by an integral number. 192 picture elements are effective picture elements sampled by the color subcarrier frequency fc.

Thus, when the picture is displayed fully on the entire effective picture screen, it may be considered preferable that 192 picture elements are provided in the horizontal direction as shown in FIG. 2.

Further, although the number of effective lines per one frame is 483, if the number is set as 480 near the above number, 240 lines, 160 lines, 120 lines, 80 lines and 60 lines are each provided by dividing 480 effective lines by an integral number. Furthermore, if 480 lines are divided by half to provide 240 lines in the non-interlaced system, 120 lines, 80 lines and 60 lines are each provided by dividing 240 lines by an integral number.

Thus, when the picture is fully displaced on the entire effective picture screen, it is desirable that the number of picture elements in the vertical direction has an integral relation to 240 picture elements, 120 picture elements, 80 picture elements and 60 picture elements.

For 192 picture elements in the horizontal direction, $192\times\frac{3}{4}=144$ is established (for an aspect ratio of 3:4) so that of the above-mentioned values, 120 picture elements are preferably provided in the vertical direction.

In other words, for the effective picture screen, 192 picture elements in the horizontal direction$\times$120 picture elements in the vertical direction are suitable.

In practice, in the practical telephone picture screen, the over-scan area of the picture tube can be adjusted so as to occupy about 15% of the entire picture screen. Therefore, even when the number of the picture elements in the horizontal and vertical directions is reduced by approximately 15% as compared with the above-mentioned values, the picture can be fully displayed on the effective picture screen by utilizing the picture elements of remaining 85%.

Thus, horizontal direction . . . 192 picture elemnts$\times$85% $\cong$160 picture elements vertical direction . . . 120 picture elements$\times$85% $\cong$100 picture elements Since 100 effective picture elements are provided per 262.5 horizontal lines of one field period with respect to the vertical direction, video data (picture element data) can be obtained at every other horizontal line.

With the above-mentioned number of picture elements, the still picture can be displayed fully on the entire effective picture screen, and also the transmission time can be expressed as $$160\times100/(192\times120)\cong69\%$$

Thus, the transmission time can be reduced more than 30% by not transmitting the overscan areas.

Furthermore, let us consider a gradation (concentration) per picture element. If there are provided 16 gradations, the bit number per picture element becomes 4 bits and the bit number on the entire picture screen is presented as 160 picture elements$\times$100 picture elements$\times$4 bits$=64\times10^3$ bits. Thus, a single 64k-bit memory can be adequate for one picture screen.

A relationship between gradation of picture and video data is determined so as to satisfy the following.

When the gradation is white, video data is presented as "0000".

When the gradation is black, video data is presented as "1111".

Therefore, the above-mentioned standards will be summarized as follows:

Picture elements in the horizontal direction: 160 picture elements

Picture elements in the vertical direction: 100 picture elements

Gradation: 16 steps (4 bits)

Figure 3:
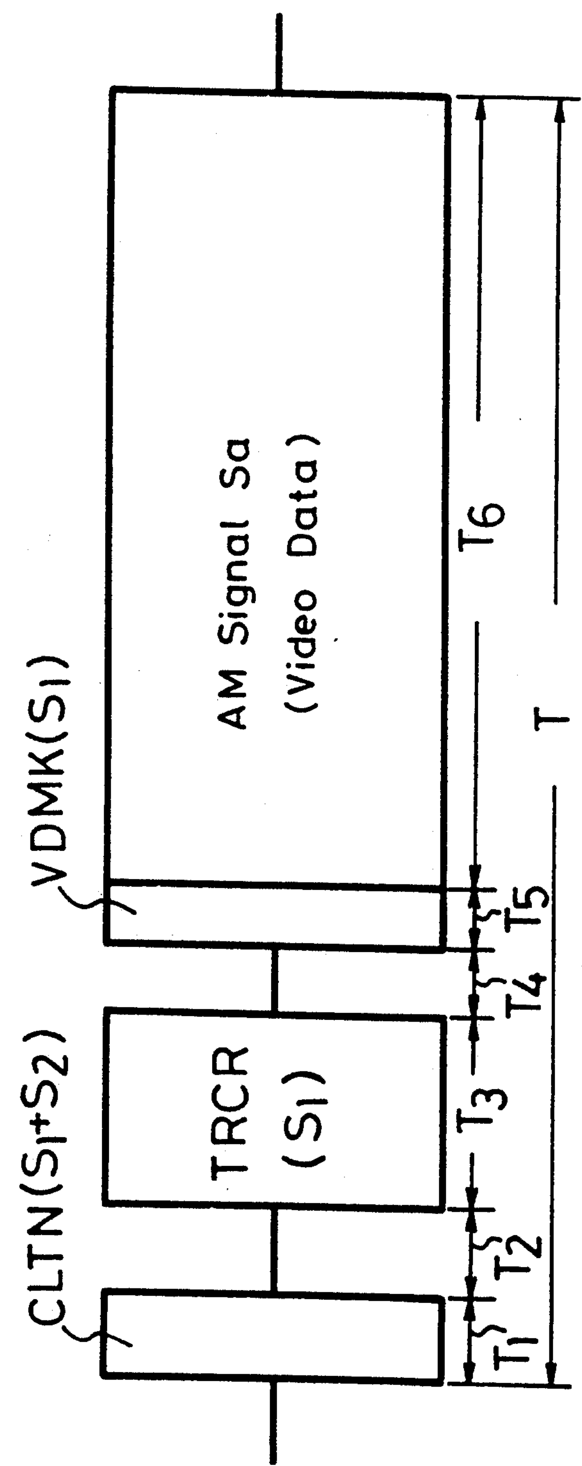
FIG. 3 is a schematic representation of a signal format used in the present invention.
Figure 4:
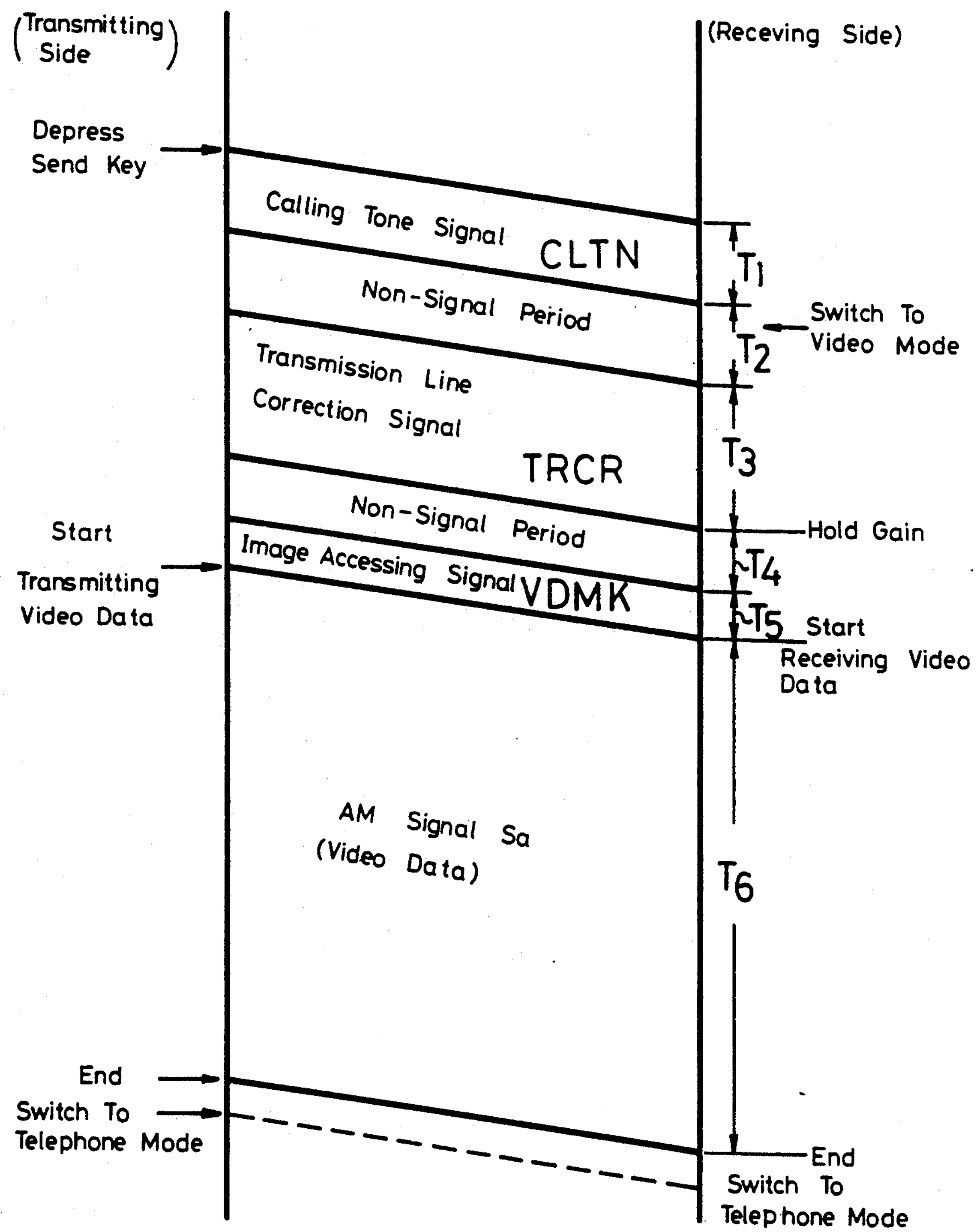
FIG. 4 is a schematic representation used to explain 'the communication protocol of the present invention.

A communication protocol for transmitting video data will be described with reference to FIGS. 3 and 4.

When the video telephone is connected to the telephone line of the other party, if a picture send key of a video telephone at the transmitting side is depressed, a calling tone signal CLTN (FIG. 3) is transmitted from the transmitting side to the receiving side during a period T1, for example, T1=0.4 seconds. This signal CLTN is used to force the video telephone at the receiving side to switch its mode from a normal communication mode to a picture receiving mode. To this end an alternating signal Sc with the color subcarrier frequency fc is divided into signals S1 and S2 with frequencies f1 and f2 expressed as follows);

$$f1 = fc/1784 \approx 2006 \text{ Hz} \qquad S1$$

$$f2 = fc/2192 \approx 1633 \text{ Hz} \qquad S2$$

and then the frequency-divided signals S1 and S2 are mixed to produce the signal CLTN or a dual tone signal of a predetermined level. Consequently, since the signal CLTN is such that the signal components having the frequencies f1 and f2 continue over the period T1, this signal can be easily and positively discriminated from an audio signals at the receiving side.

Then, the period T1 is followed by a period T2, for example, a non-signal period T2=0.4 seconds.

A transmission line correction signal TRCR is transmitted over a period T3 following the period T2. For example, T3=1 second is established. This signal TRCR is used to correct irregular transmission gains of the telephone lines in the video telephone at the receiving side. To this end, the signal TRCR has, for example, the frequency f1 and is equal to the signal S1 of the constant level. Also, a gain correction (AGC) is effected on the video telephone at the receiving side in such a manner that the level of the signal TRCR becomes a predetermined value.

The succeeding period T4, for example, T4=0.2 second is provided as a non-signal period.

Further, over the succeeding period T5, for example, T5=0.08 seconds, an image accessing signal VDMK is transmitted. This signal VMK is a synchronizing signal or a marker signal which indicates the transmission of the video data after the signal VDMK. This signal VDMK has, for example, the frequency f1 and is also equal to the signal S1 of constant level.

Figure 5:
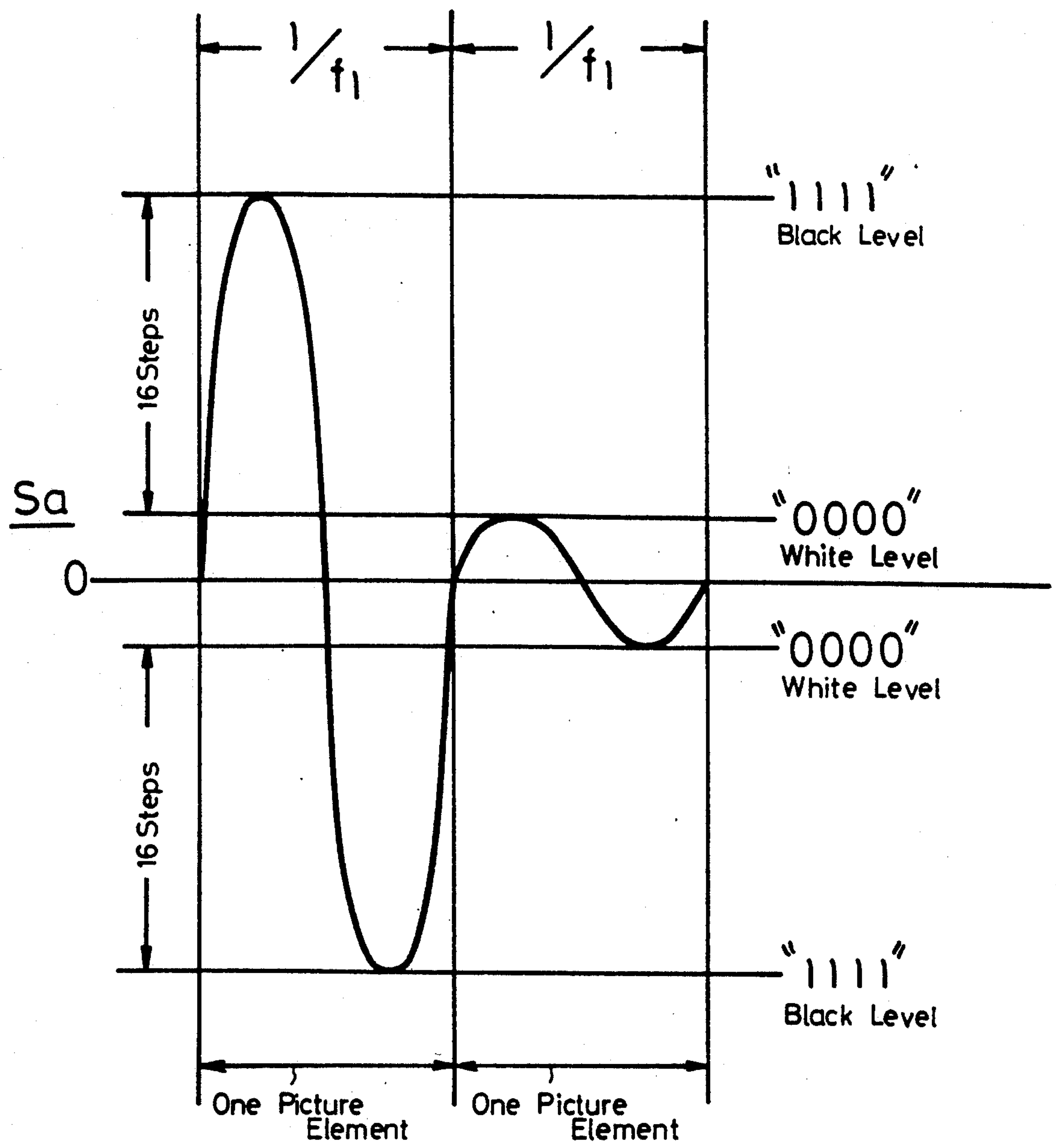
FIG. 5 is a waveform diagram used to explain the operation of the present invention.

Then the video data is transmitted over a period T6 next to the period T5. In this case, to transmit the video data, the signal S1 is AM-modulated by the video data and an AM signal Sa is transmitted. At that time, as shown in FIG. 5, one cycle of the signal Sa (S1) is assigned to video data (4 bits) of one picture element and the amplitude of one cycle is AM-modulated in accordance with the analog value (gradation) indicated by the picture element data of one picture element.

At that time, however, the modulation is limited in such a fashion that when the video data is presented as "0000" (=white level), the amplitude of the AM signal Sa is minimized and that even when the amplitude is minimum, the amplitude of the signal Sa can be prevented from becoming zero. Thus, when the amplitude is minimum, the signal Sa can be prevented from being interrupted and the signal S1 exists as a carrier signal.

Further, since one picture is formed of 160 picture elements × 100 picture elements, the following equation is established.

$$T6 = 160 \times 100 \times 1/f1 \approx 7.97 \text{ seconds}$$

Strictly speaking, the period T5 is the 160 picture-element period (160-cycle period of the signal S1) so that T5−T6/100 is less than 0.08 seconds.

Accordingly, since the period T necessary for transmitting a picture is presented as the sum total of the periods T1 to T6, $$T = T1 + T2 + \ldots T6 = 10.05 \text{ seconds is established.}$$

In other words, one picture can be transmitted approximately in 10 seconds.

The transmission rate of video data during the period T6 is expressed as $$64 \times 10^3 \text{ bits}/T6 = 4f1 \approx 8026 \text{ bps}$$

and the effective transmission rate of the whole period T is expressed as $$64 \times 10^3 \text{ bits}/T = 6368 \text{ bps}$$

In the video telephone at the transmitting side, when the transmission of the video data is ended or when the period T elapses after the transmission of the calling tone signal CLTN has just started, the video data transmission mode is changed into a telephone communication mode. Also in the video telephone at the receiving side, when the reception of the video data is ended or when the period T has elapsed after the calling tone signal CLTN has just been detected, the video data reception mode is changed into the telephone communication mode.

Figure 6:
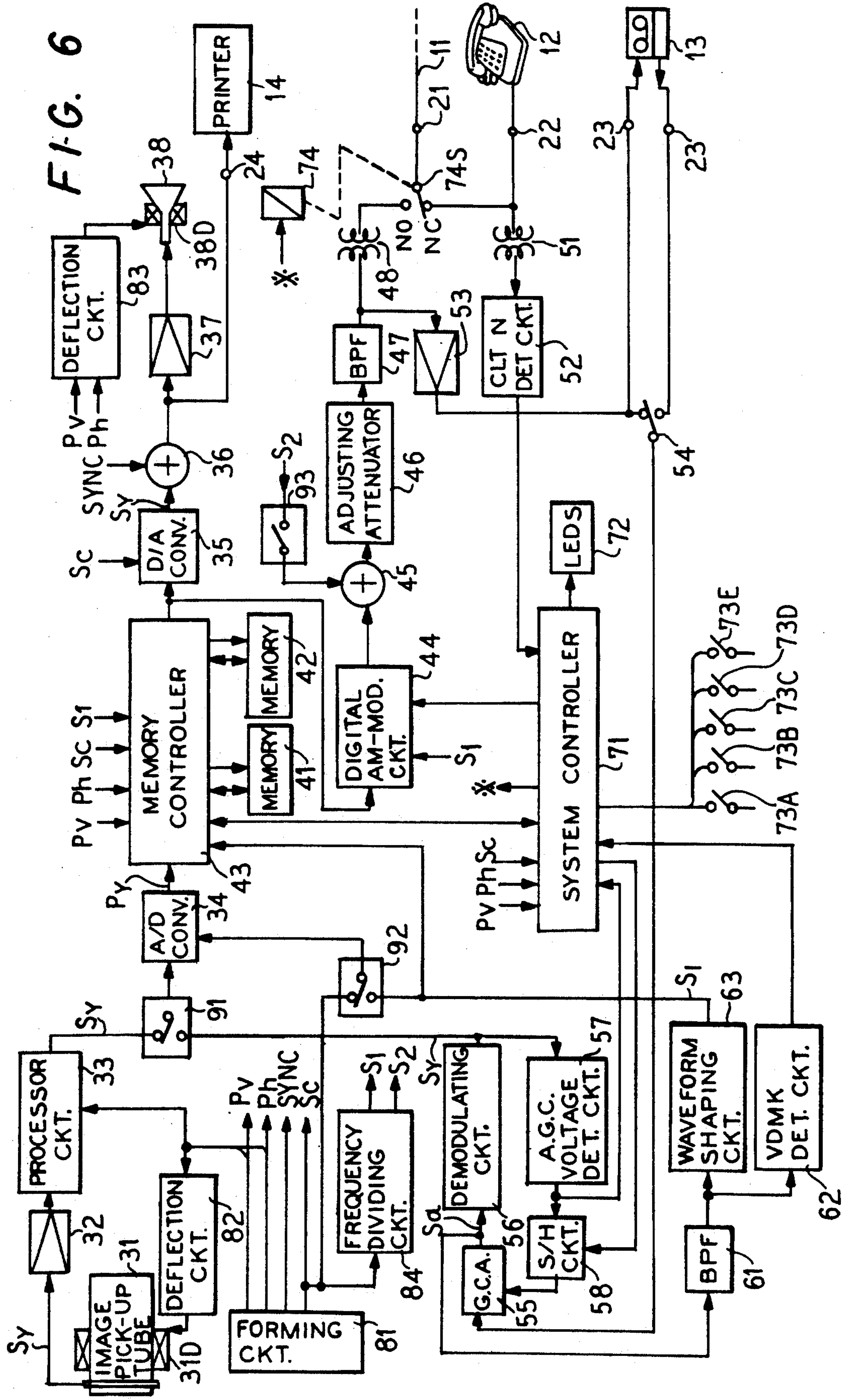
FIG. 6 is a block diagram showing an embodiment of a video telephone according to the present invention.

FIG. 6 illustrates an embodiment of a video telephone according to this invention. In this embodiment, however, the video telephone of this invention is formed as an adaptor type which can be connected to a general telephone set to realize a video telephone. The standards of picture screen and the communication protocol are arranged as described above.

In FIG. 6, reference numeral 11 designates a public telephone line, 12 a general telephone set, 13 an audio tape recorder used to preserve video data and 14 a video printer used to obtain a still picture transmitted from the other party as a hard copy. The above-mentioned apparatus 11 to 14 is connected through connectors 21 to 24 to a video telephone adaptor.

There is provided an image pick-up tube 31 which is used to pick-up an image of a user's own face or the like. There are also provided a 4-bit A/D converter 34, a 4-bit D/A (digital-to-analog) converter 35, a flat-picture receiving tube 38, for example, which displays an image, a memory 41 for storing video data which will be transmitted to the other party, a memory 42 for storing the video data transmitted from the other party, and a memory controller 43 thereof. Each of the memories 41 and 42 has a capacity of 64k bits corresponding to one picture screen. The memory controller 43 comprises gate arrays and generates signals necessary for writing in and reading out the memories 41 and 42. Also, the memory controller 43 carries out some video signal processing.

A digital AM-modulating circuit 44 is provided to convert the video data to be transmitted to the other party into the AM signal Sa. According to this modulating circuit 44, on the basis of the signal S1 as a clock, the 4-bit D/A conversion is effected to convert a parallel 4-bit video data into the AM signal Sa.

Further, there are provided a detecting circuit 52 which detects the calling tone signal CLTN transmitted from the other party, a gain control amplifier 55 which corrects the level of the received signal on the basis of the level of the received signal TRCR, an AM-demodulating circuit 56 and a system controller 71 which is formed of a microcomputer for controlling the operation of the whole apparatus. This system controller 71 is provided with a plurality of LEDs 72 for indicating the operation conditions and keys (switches) 73A to 73E used to input the operation modes.

Further, there is provided a master clock generator or forming circuit 81. This forming circuit 81 itself is formed of a one-chip IC (integrated circuit) which is employed by a video camera to generate a synchronizing signal of the NTSC system. This IC is now available on the market so that it can be obtained with ease. This IC, or the forming circuit 81 generates the color subcarrier signal Sc (frequency fc), the vertical and horizontal synchronizing pulses Pv and Ph and a composite synchronizing pulse SYNC.

The synchronizing pulses Pv and Ph from this forming circuit 81 are supplied to a deflection circuit 82 which generates vertical and horizontal deflection signals. These deflection signals are supplied to vertical and horizontal deflection coils 31D of the image pick-up tube 31. Also, the pulses Pv and Ph are supplied to a deflection circuit 83 which derives vertical and horizontal deflection signals. These deflection signals are supplied to a vertical and horizontal deflection coil 38D of the picture receiving tube 38. At that time, the overscan of about 15% is provided on the image pick-up tube 31 and the picture receiving tube 38 as described above.

The synchronizing pulses Pv and Ph are supplied to the controller 43 and the system controller 71 as signals indicating the timing of the luminance signal. The signal Sc from the clock forming circuit 81 is supplied to the controller 43 and the system controller 71, particularly to a CPU (central processing unit) within the system controller 71, as a clock. The signal Sc is further supplied to a frequency-dividing circuit 84, which divides the signal Sc to provide the signals S1 and S2. The signal S1 is supplied to the controller 43 and to the modulating circuit 44 as a carrier signal.

There are provided switching circuits 91 to 93. These switching circuits 91 to 93 are controlled by the system controller 71 through control signal lines (not shown). Reference numeral 54 designates a manual input change-over switch and 74S a relay contact. A corresponding relay 74 is also controlled by the system controller 71.

Upon non-use of this arrangement, the relay contact 74S is connected in the illustrated state so that the telephone set 12 is connected through the contact 74S to the telephone line 11. Thus, in this case, the telephone set 12 can be used in exactly the same way as is conventional, so that the apparatus is in the conventional communication mode capable of communicating with the other party.

When the apparatus is powered in the communication mode, the image pick-up tube 31 derives the luminance signal Sy according to the NTSC system. This signal Sy is supplied through a pre-amplifier 32 to a processor circuit 33, in which it undergoes signal processings such as γ-correction, and AGC or the like. The thus processed signal Sy is supplied through the switching circuit 91 to the A/D converting circuit 34. At the same time, the signal Sc from the forming circuit 81 is supplied through the switching circuit 92 to the converter 34 as a clock, whereby the signal Sy is sampled and quantized on the basis of frequency fc and is then converted into a 4-bit parallel digital luminance signal Py.

This signal Py is supplied through the controller 43 to the D/A converter 35, and the signal Sc is also supplied to the D/A converter 35 as a clock, wherein the signal Py is converted into an analog luminance signal Sy. This signal Sy is supplied to an adding circuit 36, in which it is added with the synchronizing pulse SYNC. Then, the signal Sy added with this synchronizing pulse SYNC is supplied through a video amplifier 37 to the picture receiving tube 38.

Thus, when the apparatus is powered, the image picked-up by the image pick-up tube 31 can be monitored by the picture receiving tube 38 in the form of a real moving picture.

If in this monitor mode the [pick-up] key 73B of the keys 73A to 73E is depressed, the controller 43 is controlled by the system controller 71 on the basis of this key output so that the signal Py from the converter 34 is supplied through the controller 43 to the memory 41. Also, from the controller 43, a write signal and an address signal are supplied at a cycle of the signal Sc to the memory 41 so that of the signal Py of one field period, the above-mentioned video data of 160 picture elements×100 picture elements is written into and stored in the memory 41.

After the video data is written in the memory 41, the read signal and the address signal are supplied from the controller 43 to the memory 41 at a cycle of the signal Sc with the result that the video data stored in the memory 41 are sequentially and repeatedly read out and then derived as the signal Py of the still picture. This signal Py is supplied through the controller 43 to the converter 35. Thus, the picture receiving tube 38 displays the video data stored in the memory 41 as a still picture, i.e., a picture provided at the time of depressing the [pick-up] key 73B as a still picture.

Accordingly, by operating the keys 73A and 73B repeatedly, it is possible to store video data of a desired or selected picture in the memory 41.

Then, under the condition that the video data is stored in the memory 41 (at that time, the picture receiving tube 38 displays the still picture), if of the keys 73A to 73E the [send] key 73C is depressed, on the basis of this key output, the system controller 71 drives the relay 74 so as to connect its contact 74S in the state opposite to that illustrated.

Further, the system controller 71 controls the AM-modulating circuit 44 and the switching circuit 93 such that the modulating circuit 44 derives a non-modulated carrier signal, i.e., the signal S1. This signal S1 is supplied to an adding circuit 45, and the signal S2 from the frequency-dividing circuit 84 is supplied through the switching circuit 93 to the adding circuit 45. Thus, the adding circuit 45 produces an added signal of the signals S1 and S2, i.e., the calling tone signal CLTN. This signal CLTN is transmitted to the telephone line 11 via a signal line formed of a transmitting level adjusting attenuator 46, a band-pass filter 47 used to remove undesired signal components, a transformer 48 and the contact 74S in this order.

When this signal CLTN is transmitted during the period T1, the system controller 71 controls the circuits 44 and 93 to present the non-signal period T2. Thereafter, similarly, the transmission line correction signal TRCR (=S1) is transmitted during the period T3, the non-signal period T4 is formed and the image accessing signal VDMK (=S1) is transmitted during the period T5, sequentially.

When the period T6, which follows the period T5 begins, the controller 43 supplies the read signal and the address signal to the memory 41 at the cycle of the signal S1 so that at the cycle of the signal S1, video data is read out from the memory 41 at a speed of one address per cycle of the signal S1 (4 bits per picture element). This video data is supplied through the controller 43 to the AM-modulating circuit 44, where it is modulated into the AM signal Sa. This signal Sa is similarly transmitted to the telephone line 11.

During the period T (=T1 to T6), one of the LEDs 72 lights up to indicate the transmission mode of the video data.

After the period T6 is elapsed and the transmission of all video data is completed, the relay 74 is released so that the contact 74S is again connected in the illustrated state, thus bringing about the communication mode again.

If under the condition that the real moving picture is monitored the [pick-up]key 73B is not depressed but the [send] key 73C is depressed, similarly to such a case that the key 73B is depressed, the video data produced at a time point in which the key 73C is depressed is stored in the memory 41 and the video data is then transmitted to the telephone line 11 as described above.

Further, if the tape recorder 13 is set in the recording mode continuously over the period T in which the video data is being transmitted to the other party, the AM signal Sa is supplied from the filter 47 through a buffer amplifier 53 to the tape recorder 13, whereby the signal Sa is recorded on its tape.

If on the other hand the video data is transmitted from the other party during communication, the calling tone signal CLTN located at the beginning thereof is supplied through a signal line of the telephone line 11, the contact 74S and a transformer 51 to the detecting circuit 52 which detects the signal CLTN. The detected output therefrom is supplied to the system controller 71.

Then, on the basis of the detected output, the system controller 71 drives the relay 74 to connect its contact 74S to the state opposite to the illustrated state.

Thus, when the transmission line correction signal TRCR is transmitted during the period T3, this signal TRCR is supplied through a signal line of the telephone line 11, the contact 74S, the transformer 48, the amplifier 53, the switch 54 and the gain control amplifier 55 to the AM-demodulating circuit 56. Then, the demodulated output therefrom is supplied to an AGC voltage detecting circuit 57 formed of, for example, a low-pass filter from which is produced as a dc voltage of level corresponding to the level of the signal TRCR. This dc voltage is sampled and held by a sample and hold circuit 58 in response to the control signal from the system controller 71. The held output therefrom is supplied to the gain control amplifier 55 as a control signal. Therefore, the gain of the amplifier 55 is controlled to fall in a range of values complementary to the gains from the other party to the telephone line 11. Thus with respect to the signals received after the period T4, irregular levels due to the irregular gains up to the telephone line 11 are corrected to be predetermined levels.

When the image accessing signal VDMK is transmitted during the period T5, this signal VDMK is supplied from the amplifier 55 through a band-pass filter 61 to a detecting circuit 62 which detects the signal VDMK. The detected output therefrom is supplied to the system controller 71.

Then, on the basis of the detected output, the system controller 71 controls the switching circuits 91 and 92 to be connected to the states opposite to the illustrated states. Also, the system controller 71 supplies to the controller 43 a signal indicative of the starting time point of the period T6.

The amplifier 55 derives the AM signal Sa during the period T6. This signal Sa is supplied to the demodulating circuit 56, in which it is demodulated into the analog luminance signal Sy, or it is demodulated into the luminance signal Sy of level indicating the level of each picture at every cycle of the signal Sa. This signal Sy is supplied through the switching circuit 91 to the A/D converter 34 and the signal Sa from the amplifier 55 is supplied through the filter 61 to a waveform shaping circuit 63, wherein a carrier component of the signal Sa is shaped into an alternating signal synchronized therewith, i.e., the signal S1. This signal S1 is supplied through the switching circuit 92 to the A/D converter 34 as a clock and is also supplied to the controller 43 as a clock used upon reception.

In this way, the luminance signal Sy from the demodulating circuit 56 is converted into the digital signal Py (video data) by the converter 34 in synchronism with the signal S1. This signal Py is supplied through the controller 43 to the receiving memory 42, and from the controller 43, the write signal and the address signal synchronized with the receiving clock signal S1 are supplied to the memory 42 so that the signal Py is sequentially written in the memory 42 and then stored.

During the periods T1 to T6 in which the video data is received and processed, one of the LEDs 72 goes on, indicating the reception mode of the video data.

After the period T6 has been ended and all of the signal Py, i.e., all the received data have been stored in the memory 42, the controller 43 supplies the read signal and the address signal to the memory 42 at a cycle of the signal Sc, whereby the video data stored in the memory 42 are sequentially and repeatedly read out and then produced as the signal Py indicative of the still picture. The signal Py is supplied to the D/A converter 35. Thus, in exactly the same way in which the video data stored in the memory 41 is monitored on the picture receiving tube 38 as a still picture, the video data transmitted from the other part is monitored on the picture receiving tube 38 as a still picture.

If, upon reception of the video data, the tape recorder 13 is set in the recording mode over the period T, the AM signal Sa or the like transmitted from the other party is recorded on the tape.

At the completion of the period T6, the relay 74 is not driven any more so that the contact 74S thereof is again returned to the illustrated state, thus the communication mode is brought about again.

As described above, when the video data is transmitted from the other party, video data is stored in the memory 42 and then monitored on the picture receiving tube 38 as a still picture.

When the video data to be transmitted to the other party is stored in the memory 41 and the video data transmitted from the other party is stored in the memory 42, if the [other party] key 73D of the keys 73A to 73E is depressed, the video data is read out from the memory 42. The thus read out video data is converted into the luminance signal Sy and then fed to the picture receiving tube 38. When the [user] key 73E is depressed, the video data is read out from the memory 41 and this video data is converted into the luminance signal Sy, which is fed to the picture receiving tube 38. Thus, the image to be transmitted to the other party or the image transmitted from the other party can be freely selected and then displayed by operating the key 73D or 73E.

Further, if the switch 54 is connected in the, state opposite to the illustrated state, and then the signal recorded on the tape of the tape recorder 13 is reproduced, the reproduced signal is similarly processed by the circuits following the amplifier 55 instead of the signal transmitted from the telephone line 11, so that the image recorded on the tape is displayed on the picture receiving tube 38. Therefore, by preparing the tape recorder 13, it is possible to preserve the still picture as a file.

Figure 7:
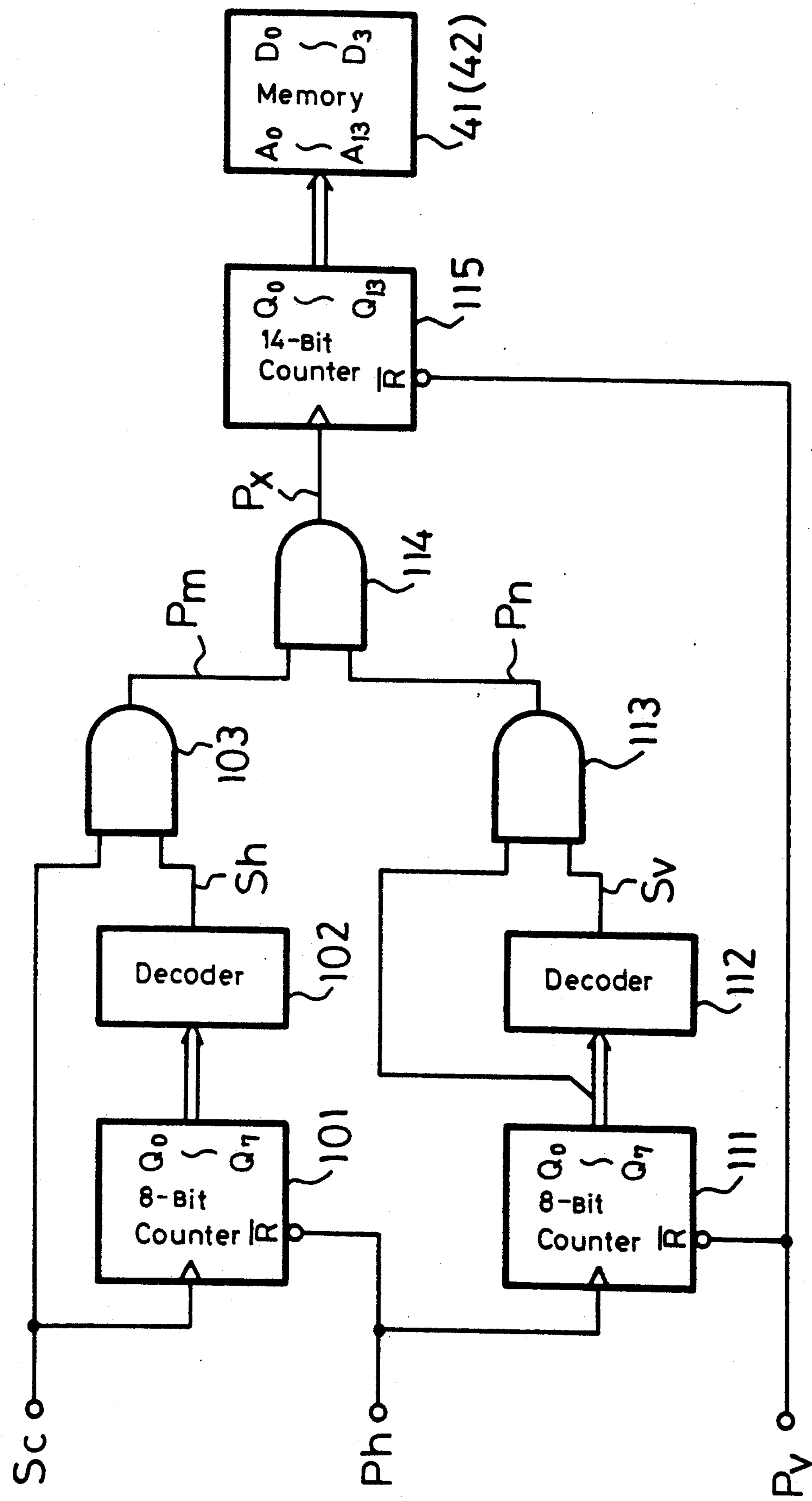
FIG. 7 is a block diagram showing an example of an address signal generating circuit used in the embodiment shown in FIG. 6.

FIG. 7 illustrates an example of an address signal forming circuit provided in the controller 43 to supply the address signals to the memories 41 and 42.

Specifically, the horizontal synchronizing pulse Ph is supplied to an 8-bit counter 101 as a reset input and the signal Sc is also supplied thereto as a count input so that the count value of the counter 101 is reset to [0] at every trailing edge of the pulse Ph and so that it is incremented by [1] at every cycle (corresponding to one picture element) of the signal Sc.

The count output from this counter 101 is supplied to a decoder 102 which derives a signal Sh which becomes "1" during a period where the counter 101 counts up to-[160 ] after the count value becomes, for example, [41] as shown in FIGS. 8A and 8B. This signal Sh is supplied to an AND circuit 103 and also the signal Sc is supplied to the AND circuit 103 which therefore produces, during a 160 -picture element period located near the center of one horizontal period, 160 cycles of the signal Sc as an AND output Pm.

Further, the vertical synchronizing pulse Pv is supplied to an 8-bit counter 111 as a reset signal and also the horizontal synchronizing pulse Ph is supplied thereto as a count input with the result that the count value of the counter 111 is reset to [0] at every trailing edge of the pulse Pv and so that it is incremented by [1] at every pulse Ph, i.e., at every horizontal line.

The count output from this counter 111 is supplied to a decoder 112 which derives a signal Sv which becomes "1" during a period where the counter 111 counts up to [200] (200pulses Ph) after the count value becomes, for example, [40] This signal Sv is supplied to an AND circuit 113, and the least significant bit $Q_O$ of the count output from the counter 111 is supplied to the AND circuit 113. In this case, the least significant bit $Q_O$ is inverted to "0" to "1" each time the pulse Ph is counted by one. Thus, the AND circuit 113 produces an AND output Pn which becomes "1" during a period of 200horizontal lines located at the center of one field period and also, for example, during the odd-numbered horizontal line period thereof. Since the horizontal line period of "1" is the odd-numbered horizontal line period of the 200-horizontal line period, there are 100 horizontal line periods at every field period.

This signal Pn and the signal Pm are supplied to an AND circuit 114 so that the AND circuit 114 generates a pulse Px of 160×100 cycles at every field period. In other words, at every field period the pulse Px is generated during the odd-numbered 100 horizontal line periods located at the center of the picture screen and also during 160 picture element periods of the 100 horizontal line periods thereof.

This pulse Px is supplied to a 14-bit counter 115 as a count input and the pulse Pv is supplied thereto as a reset input. Then, the count output of the counter 115 is supplied to the memory 41 (or 42) as an address signal. In this case, the memory 41 is arranged to have a capacity of 16K addresses in which one address is formed of 4 bits.

Accordingly, the address of the memory 41 is started from an address 0 at every field period and is incremented by one address each during the odd-numbered 100 horizontal line periods located at the center of the picture and also during 160 picture element periods of the 100 horizontal line periods.

At that time, if a read signal or a write signal is formed from the pulse Px and it is supplied to the memory 41, the video data can be written in or read out from the memory 41, whereby the luminance signal Sy derived from the image pick-up tube 31 can be written in the memory 41 or the luminance signal Sy to be displayed on the picture receiving tube 38 can be read out therefrom. While, upon reading, the video data is not read out at every odd-numbered horizontal line, a black level signal formed of, for example, the signal Pn may be substituted for such video data.

When the video data of the memory 41 is transmitted to the other party or the video data transmitted from the other party is written in the memory 42, instead of the signal Px, the signal S1 from the frequency-dividing circuit 84 or the waveform shaping circuit 63 is supplied to the counter 115.

In this way, according to the present invention, the video telephone can be realized by utilizing the public telephone lines. In this case, particularly, according to the present invention, since the video data of one picture is thinned on the basis of the above-mentioned technique and the number of data is reduced by utilizing the over-scan operation, the video telephone of the invention can provide a satisfactory picture and the video data can be transmitted in a period of time as short as about 10 seconds.

Since each of values [160 ] and [100 ], which are the numbers of picture elements in the horizontal direction and in the vertical direction, has a number of measures and also [192 ] and [144 (120 )], which are the basis of these measures, have an integer divided relation to the numbers of the picture elements where the color subcarrier frequency fc is taken as the sampling frequency, the signal format between it and the video signal of the standard system or a video signal pursuant thereto can be converted with ease, such as by duplicating or interpolating the picture elements.

Since the signal processings are carried out in the respective circuits by utilizing the signals Sc, Pv and Ph formed by the signal forming circuit 81 and the frequency-divided signals S1 and S2 of the signal Sc, the PLL for forming the master clock from the synchronizing pulse Ph may be removed, unlike the prior art, to thus reduce the cost of the video telephone. Particularly, the forming circuit 81 is formed of an IC for a video camera and is inexpensive.

Further, according to the above-mentioned communication protocol, one still picture can be transmitted in about 10 seconds and the time for awaiting the transmission of the video data can be reduced. Besides, the video data can be preserved on the tape of the general video tape recorder 13.

Furthermore, while the telephone set 12 and the tape record 13 are provided independently of the apparatus as described above, they can be combined with the video telephone. In this case, the video data can be recorded on an automatic answering telephone or transferred to another video telephone for monitoring. Furthermore, when the signal Sy from the processor circuit 33 is A/D-converted by the converter 34, the signal Px can be used as a clock.

The above description is given on the basis of a single preferred embodiment of the present invention and it will be apparent that many modifications and variations thereof could be effected by one with ordinary skill in the art without departing from the spirit and scope of the novel concepts of the invention, so that the scope of the invention should be determined only by the appended claims.

It will be apparent that various modifications and/or additions may be made in the apparatus of the invention without departing from the essential feature of novelty involved, which are intended to be defined and secured by the appended claims.

What is claimed is:

1. A video telephone for transmitting video data of a still picture through an audio signal line comprising:

a) an image pick-up tube for picking up a picture of said still picture in accordance with the standard television systems, such as the NTSC system;

b) an A/D (analog-to-digital) converter for converting the analog output picked up by said image pick-up tube to form a digital signal;

c) a memory for storing the output of said A/D converter as video data;

d) a modulating circuit for modulating said video data stored in said memory into a modulated signal having a predetermined frequency band corresponding to a transmission band of said signal line;

e) a circuit for transmitting the modulated output of said modulating circuit to said signal line;

f) a circuit for generating a color subcarrier signal of said standard television system and a synchronizing pulse of said standard television system and for supplying said subcarrier signal and said synchronizing pulse to said image pick-up tube; and g) a frequency-dividing circuit for producing from said color subcarrier signal, the signals necessary for said A/D converter, said memory and said modulating circuit, wherein said video data is a signal which results from thinning said picked-up output at a predetermined ratio and a signal, corresponding to an effective picture screen of which the upper, lower, right and left portions are removed, in a frame shape is extended to the whole of said effective picture screen by an over-scan operation.

* * * * *